United States Patent [19]
Benjamin et al.

[11] 4,080,849
[45] Mar. 28, 1978

[54] PRECISION HEAVY DUTY INDEXER

[75] Inventors: Milton Lloyd Benjamin, Chagrin Falls; David Dean Walker, Solon; Wilbur Nelson Miles, Chagrin Falls, all of Ohio

[73] Assignee: Erickson Tool Company, Solon, Ohio

[21] Appl. No.: 749,799

[22] Filed: Dec. 13, 1976

[51] Int. Cl.$^2$ .............................................. B23B 29/32
[52] U.S. Cl. .................................. 74/813 R; 74/820; 74/826
[58] Field of Search ............. 74/813 R, 813 C, 813 L, 74/817, 820, 826, 827; 91/35, 40; 100/223

[56] References Cited
U.S. PATENT DOCUMENTS

| | | | |
|---|---|---|---|
| 3,545,317 | 12/1970 | Shultz et al. | 74/826 X |
| 3,718,055 | 2/1973 | Maier | 74/813 L X |
| 3,877,322 | 4/1975 | Benjamin et al. | 74/818 X |
| 3,941,014 | 3/1976 | Benjamin et al. | 74/826 |
| 4,006,651 | 2/1977 | Anderson et al. | 74/813 R X |

Primary Examiner—Edgar W. Geoghegan
Attorney, Agent, or Firm—Donnelly, Maky, Renner & Otto

[57] ABSTRACT

A precision heavy duty indexer characterized in that the indexing member thereof is positively locked to the indexer housing in desired precise axial, radial and angular indexed position by interengaged gear means of said indexing member and said housing, and is unlocked for indexing movement by disengaging said gear means, the gear means of said housing being carried by the outer peripheral portion of a laterally flexible pneumatic or hydraulically-actuated diaphragm having its inner peripheral portion fixed to the housing.

10 Claims, 4 Drawing Figures

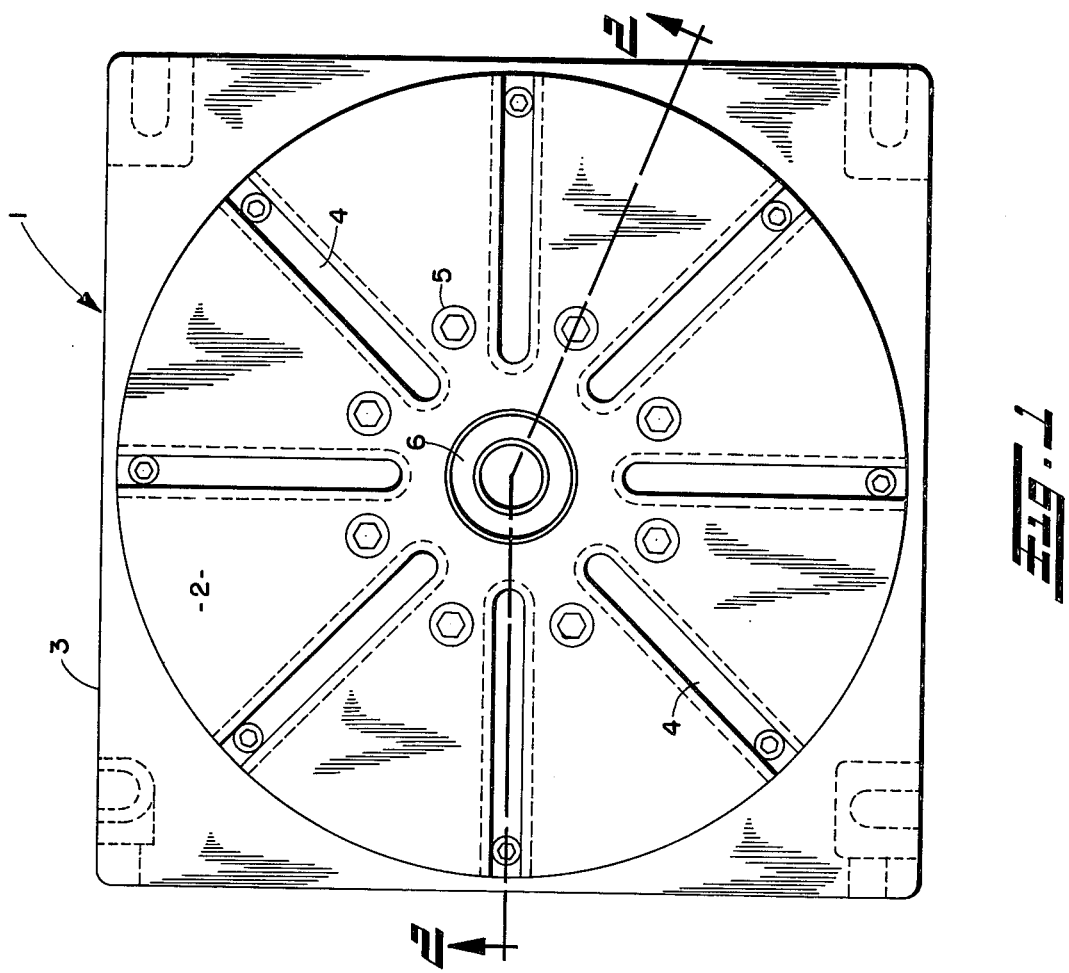
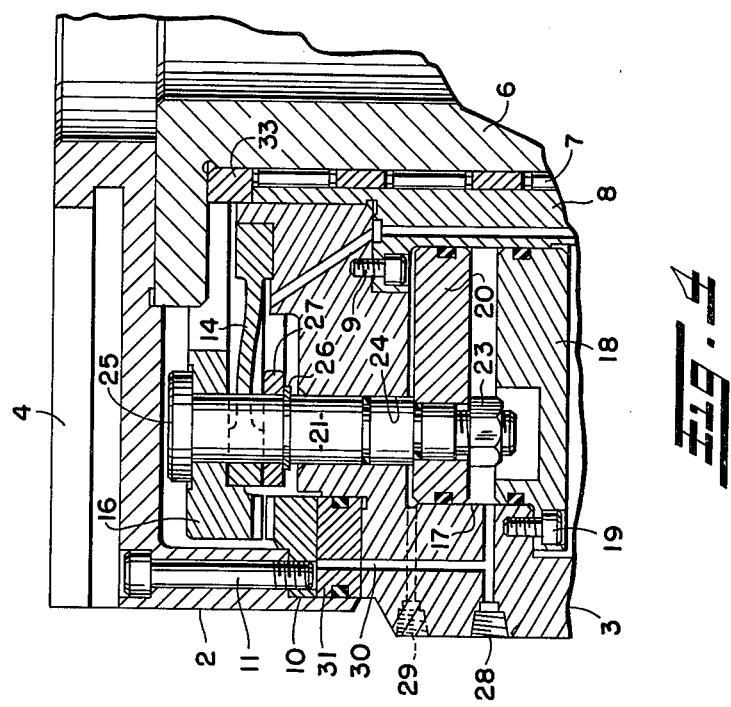

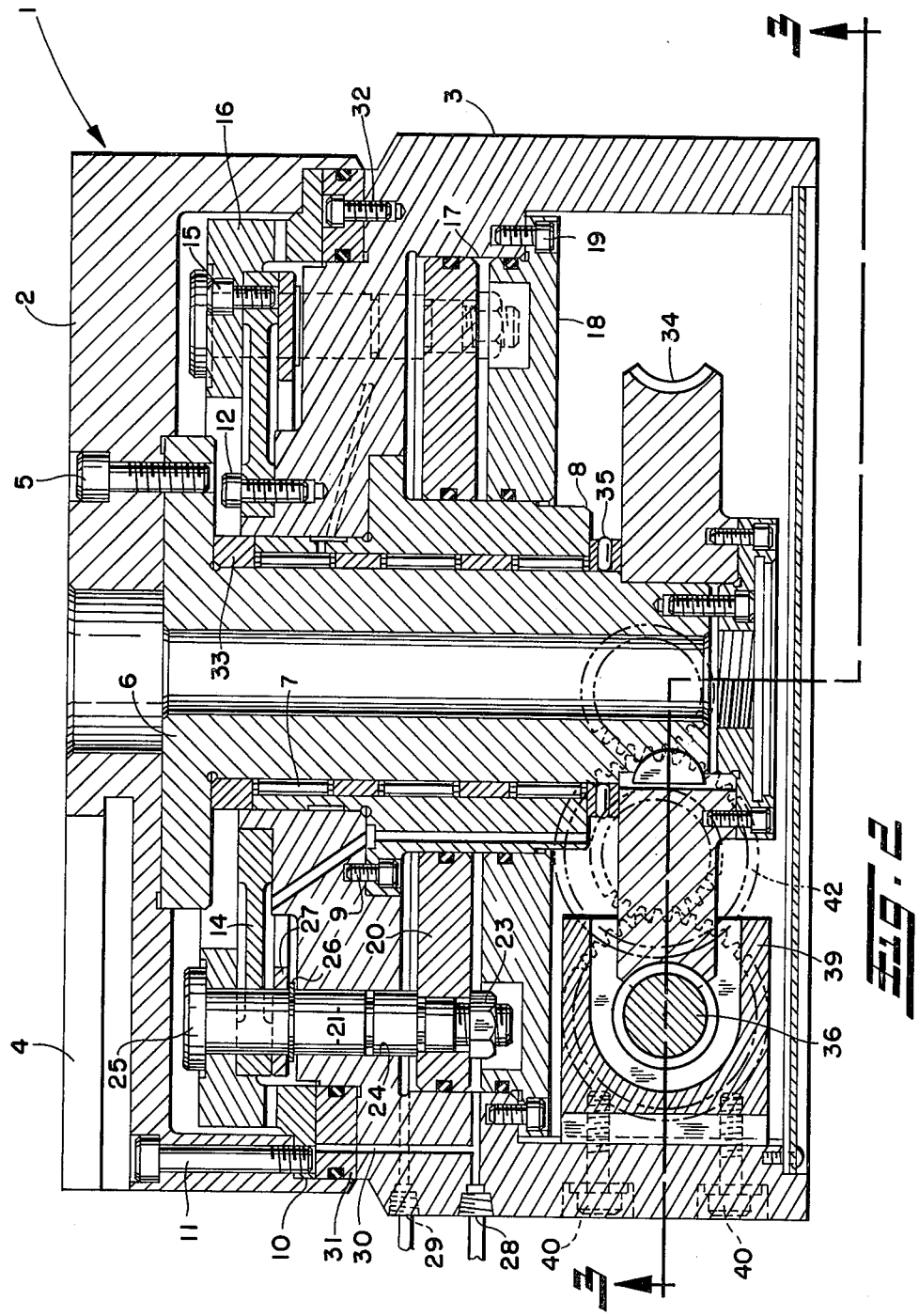

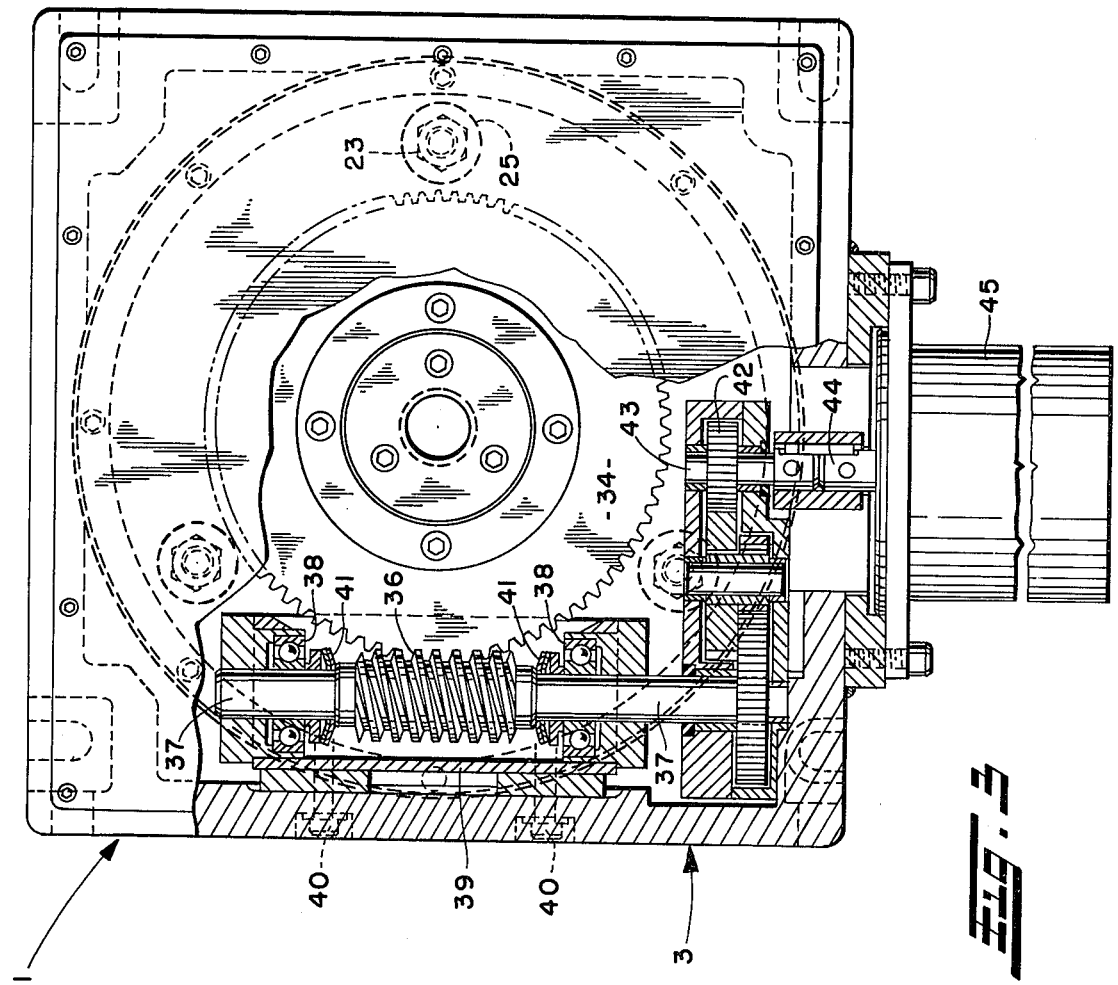

PRECISION HEAVY DUTY INDEXER

BACKGROUND OF THE INVENTION

In a known form of precision heavy duty indexer such as disclosed in U.S. Pat. No. 3,941,014, the indexing member is accurately and securely locked to the indexer housing by annular rows of axially interfitting radially extending teeth of form such as to eliminate axial, circumferential, and radial play in all indexed positions and to prevent transmission of torque loads on the indexing member to the indexing member drive means and to prevent transmission of radial loads on the indexing member to the indexing member-housing bearings. However, in such indexer the indexing member is axially movable with respect to the housing to engage and disengage the aforesaid teeth thus to lock said indexing member in indexed position and to unlock said indexing member for indexing to the next position. Hence, when said indexing member is in locked position, axial load thereon imposes additional compressive load on the engaged teeth.

In another known form of indexer as disclosed in U.S. Pat. No. 3,877,322, a diaphragm-type disc brake has its inner peripheral portion fixed to the indexing member and has its outer peripheral portion laterally flexed into frictional gripping engagement between the indexer housing and a hydraulically-actuated ring. However, in this form of indexer large axial and radial loads on the indexing member may impose severe axial and radial loads on the indexing member-housing bearings and large torque loads on the indexing member may impose severe shear loads on the locking pin of the indexing member drive means.

SUMMARY OF THE INVENTION

In contradistinction to the foregoing, the present heavy duty precision indexer has an indexing member which is positively locked in indexed position by interengaged gear means and released from such locked position for indexing movement by disengagement of said gear means without axial movement of said indexing member.

It is a principal object of this invention to provide an indexer of the character indicated in which the housing and indexing member have abutting annular portions in both the locked and unlocked condition of the indexing member, said portions in the locked condition effectively resisting axial load on the indexing member and in the unlocked condition constituting an axial thrust bearing to facilitate indexing of said indexing member.

Another object of this invention is to provide an indexer of the character indicated in which, when the indexing member is in unlocked condition, the aforesaid abutting annular portions constitute a fluid thrust bearing, which may either be pneumatic or hydrostatic, to decrease the torque required to effect indexing movement of the indexing member.

Other objects and advantages will appear from the ensuing description.

BRIEF DESCRIPTION OF THE DRAWING

FIG. 1 is a top plan view of an indexer embodying the present invention;

FIG. 2 is a cross-section view taken substantially along the line 2—2, FIG. 1;

FIG. 3 is a cross-section view taken substantially along the line 3—3, FIG. 2; and FIG. 4 is a fragmentary cross-section view corresponding to the upper left portion of FIG. 2 except showing the indexing member released from locked position ready for indexing to the next position.

DETAILED DESCRIPTION OF A PREFERRED EMBODIMENT

The precision heavy duty indexer 1 herein disclosed comprises an indexing member or table 2 which is supported for rotary indexing about its central vertical axis on a housing assembly 3 which is adapted to be mounted on the bed or base of a planer, a shaper, a milling machine, or other machine tool for performance of machining operations on a workpiece adapted to be mounted on the indexing member 2 through well known means including the use of the radial slots 4. The indexing member 2 has secured thereto by the screws 5 a spindle member 6 which supports the indexing member 2 for rotary indexing movement by radial thrust needle or roller bearings 7 contained in a bearing housing member 8 secured to the housing 3 as by the screws 9.

The indexing member 2 has a downwardly extending skirt portion to which a ring gear 10 is affixed by screws 11, said gear 10 having an annular row of upwardly facing radial gear teeth.

The upper end of the housing 3 has secured thereto by the screws 12 the inner peripheral portion of a diaphragm member 14 of which the outer peripheral portion is secured by screws 15 to a ring gear 16 having downwardly facing radial gear teeth engaged with the teeth of the gear 10 (see FIG. 2) and disengaged from the teeth of gear 10 upon upward flexing of the diaphragm member 14 as shown in FIG. 4. As disclosed in the aforesaid U.S. Pat. No. 3,941,014, the ring gears 10 and 16 form a so-called Curvic coupling in which the teeth are tapered and have mating convexly and concavely curved flanks to eliminate circumferential, axial and radial play when said teeth are interengaged.

The external surface of the member 8 and the bore 17 in the housing 3 define an annular fluid cylinder which is closed by a ring 18 secured to the housing as by screws 19. Vertically reciprocable in the cylinder is an annular piston 20 which has three or more equally spaced posts 21 secured thereto by the nuts 23 to extend upwardly through the housing bores 24. The posts 21 have heads 25 engaging the upper side of the ring gear 16 and axially retained on the posts 21 by the snap rings 26 is a ring 27 which engages the bottom side of the outer peripheral portion of the diaphragm member 14.

The housing 3 has passages 28 and 29 leading into the cylinder on opposite sides of the piston 20, said passages 28 and 29 being adapted to be communicated with a four-way valve or the like (not shown) so that a suitable fluid such as air or oil under pressure may be admitted through passage 28 into the chamber under the piston 20 or through passage 29 into the chamber above the piston 20. As evident, when fluid under pressure is admitted into the lower chamber, the upward movement of the piston 20 and posts 21 will, through the ring 27, upwardly deform the diaphragm member 14 as shown in FIG. 4 thus to disengage the ring gear 16 from the ring gear 10. The housing 3 has a passage 30 leading from the passage 28 through a thrust bearing ring 31 secured as by screws 32 to the housing 3 so that fluid under pressure will reach the mating annular surfaces of the ring gear 10 and thrust bearing ring 31 to provide a pneumatic or hydrostatic bearing to facilitate rotary indexing movement of the indexing member 2 when the diaphragm member 14 is flexed as shown in FIG. 4.

When pressure in the lower chamber is released, the diaphragm member 14 will, by its own resiliency and the pressure in the upper chamber urging the piston 20 downwardly, return to the FIG. 2 position whereat the ring gears 10 and 16 are in interengagement, and whereat the annular surfaces of the ring gear 10 and thrust bearing ring 31 are in abutting engagement. The fluid which is admitted under pressure through passage 29 into the upper chamber urges the piston 20 downwardly, and through the heads 25 of posts 21, exerts downward force on ring gear 16 tending to compress the ring gear 10 against the thrust bearing ring 31. Accordingly, the housing 3 and ring 31 provide strong support of the indexing member 2 even against large axial loads without overloading the teeth of ring gears 10 and 16 or without overloading the indexing member 2 housing 3 bearings. A spacer ring 33 may be provided between the flange of spindle 6 and the upper end of the bearing housing member 8.

Driving of the indexing member 2 from one indexed position to the next is effected by a worm wheel 34 which is keyed onto the lower end of the spindle 6. An axial thrust bearing 35 is interposed between the worm wheel 34 and the lower end of the bearing housing member 8 to substantially eliminate upward movement of the indexing member 2 by fluid under pressure between ring gear 10 and thrust bearing ring 31 and to decrease the force required to turn worm wheel 34, spindle 6, and indexing member 2.

Meshing with the worm wheel 34 is a worm 36 having shaft portions 37 journalled in anti-friction bearings 38 in a bearing housing 39 secured to the indexer housing 3 by screws 40 and doweled in place. Belleville-type spring washers 41 axially center the worm 36 in the bearing housing 39, said washers 41 being capable of yielding to limit tooth loads in the event that the indexing movement of the worm wheel 34 and indexing member 2 is not exactly the same as the spacing provided by the teeth of the ring gears 10 and 16. The worm 36 is driven through reduction gearing 42 of which the input shaft 43 is coupled to the drive shaft 44 of a motor 45 (hydraulic or electric) secured on one side of the indexer housing 3. In the example herein given, the gears 10 and 16 have 360 teeth and one revolution of the worm 36 turns the worm wheel 34 and indexing member 2 10°, that is a 36:1 ratio, and the reduction gearing 42 provides a 4:1 reduction whereby 144° of rotation of the motor drive shaft 44 will cause 1° indexing movement of the indexing member. As well known in the art, a resolver, not shown, may be connected to the worm shaft 37 of the motor drive 45, if electric, or if a hydraulic motor is used, a suitable counting mechanism may be provided for counting the number of revolutions of the motor drive shaft 44 (0.40 times the number of degrees of desired indexing movement).

When the indexer 1 is in locked indexed position with fluid under pressure in the upper chamber of the cylinder, the downward force exerted by the gear ring 16 on the gear ring 10 will effect solid and tight interengagement of the gear ring 10 with the thrust bearing ring 31 whereby the Curvic coupling teeth will accurately center the indexing member 2. Accordingly, with a workpiece mounted on the indexing member 2, axial thrust loads will be supported by the engagement of the mating annular surfaces of the rings 10 and 31 of the indexing member 2 and housing 3. Moreover, the frictional engagement of these surfaces and the engagement of the Curvic coupling teeth will prevent radial and tangential loads from being transmitted to the radial thrust bearings 7 of the indexing member spindle 6 or to the teeth of the worm wheel 34 and worm 36.

After the machining operation on the workpiece has been completed at each indexed position of the indexing member 2, the fluid pressure in the upper chamber above piston 20 is released and fluid under pressure is admitted into the lower chamber through passage 28 to unlock the indexing member 2 for indexing movement to the next position while the teeth of the gears 10 and 16 are disengaged as in FIG. 4. As already mentioned, fluid under pressure through the passage 30 reaches the interengaged faces of the gear 10 and thrust bearing ring 31 to form a pneumatic or hydrostatic bearing to facilitate indexing movement to the next position.

The embodiments of the invention in which an exclusive property or privilege is claimed are defined as follows:

1. An indexer comprising a housing; an indexing member supported by said housing for rotary indexing movement; said housing and indexing member having mating annular surfaces which support said indexing member against axial load thereon in all indexed positions thereof and which constitute an axial thrust bearing during indexing of said indexing member; said housing and indexing member having interengaging gears operative to retain said member in each of its indexed positions; double acting actuating means in said housing operative to axially shift said housing gear out of engagement with and into engagement with said indexing member gear thus respectively to release said indexing member for indexing movement while supported by said mating annular surfaces and to lock said indexing member in indexed position while forcefully pressing said mating annular surfaces together; and drive means in said housing for imparting rotary indexing movement to said indexing member when said gears are disengaged.

2. The indexer of claim 1 wherein said housing gear is secured to the outer peripheral portion of a laterally flexible diaphragm of which the inner peripheral portion is fixed to said housing; said actuating means being operatively connected to said outer peripheral portion of said diaphragm.

3. The indexer of claim 2 wherein said actuating means includes a fluid cylinder in said housing having its piston operatively connected to the outer peripheral portion of said diaphragm to flex said diaphragm to disengage said housing gear from said indexing member gear in response to fluid pressure acting on one side of said piston; said piston in response to fluid pressure acting on the other side thereof, causing forceful interengagement of said gears and forceful pressing together of said mating annular surfaces.

4. An indexer comprising a housing; an indexing member supported by said housing for rotary indexing movement; said housing and indexing member having mating annular surfaces which support said indexing member against axial load thereon in all indexed positions thereof and which constitute an axial thrust bearing during indexing of said indexing member; said housing and indexing member having interengaging gears operative to retain said indexing member in each of its indexed positions; said housing gear being secured to the outer peripheral portion of a laterally flexible diaphragm of which the inner peripheral portion is fixed to said housing; actuating means in said housing operative to axially shift said housing gear out of engagement with and into engagement with said indexing member gear thus respectively to release said indexing member for indexing movement and to lock said indexing member in indexed position; said actuating means including a fluid cylinder in said housing having its piston operatively connected to the outer peripheral portion of said diaphragm to flex said diaphragm to disengage said housing gear from said indexing member gear in response to fluid pressure acting on one side of said piston; and drive means in said housing for imparting rotary indexing movement to said indexing member when said gears are disengaged; said thrust bearing being a fluid thrust bearing via a housing passage communicating with fluid pressure acting on said one side of said piston.

5. An indexer comprising a housing having a bore with radial thrust bearing means therein; an indexing member having a spindle supported by said bearing means for rotary indexing movement of said indexing member; said housing and indexing member having mating annular surfaces which support said indexing member against axial load thereon in all indexed positions thereof and which constitute an axial thrust bearing during indexing of said indexing member; said housing and indexing member having interengaging gears operative to retain said indexing member in each of its indexed positions; said housing gear being secured to the outer peripheral portion of a laterally flexible diaphragm of which the inner peripheral portion is fixed to said housing; actuating means in said housing operative to axially shift said housing gear out of engagement with and into engagement with said indexing member gear thus respectively to release said indexing member for indexing movement and to lock said indexing member in indexed position; said actuating means including a fluid cylinder in said housing having its piston operatively connected to the outer peripheral portion of said diaphragm to flex said diaphragm to disengage said housing gear from said indexing member gear in response to fluid pressure acting on one side of said piston; and drive means in said housing operatively connected to said spindle for imparting rotary indexing movement to said indexing member when said gears are disengaged; said thrust bearing being a fluid thrust bearing via a housing passage communicating with fluid pressure acting on said one side of said piston.

6. An indexer comprising a housing having a bore with radial thrust bearing means therein; an indexing member having a spindle supported by said bearing means for rotary indexing movement of said indexing member; said housing and indexing member having mating annular surfaces which support said indexing member against axial load thereon in all indexed positions thereof and which constitute an axial thrust bearing during indexing of said indexing member; said housing and indexing member having interengaging gears operative to retain said indexing member in each of its indexed positions; actuating means in said housing operative to axially shift said housing gear out of engagement with and into engagement with said indexing member gear thus respectively to release said indexing member for indexing movement and to lock said indexing member in indexed position; and drive means in said housing operatively connected to said spindle for imparting rotary indexing movement to said indexing member when said gears are disengaged; said drive means comprising a worm wheel keyed on said spindle with anti-friction axial thrust bearing means between said worm wheel and said housing; a worm journalled in said housing in meshing relation with said worm wheel; and a drive motor on said housing operative through reduction gearing in said housing to drive said worm.

7. An indexer comprising a housing having a bore therein; an indexing member having a spindle journalled in said bore for rotary indexing movement about the axis of said bore; said housing and indexing member having mating annular surfaces which support said indexing member against axial load in all indexed positions thereof and which constitute an axial thrust bearing during indexing of said indexing member; said spindle and housing having radially overlapped surfaces; said housing and indexing member having annular gears with axially interfitting radial teeth which when interengaged are operative to urge said mating annular surfaces into firm frictional engagement to resist axial load on said indexing member and to lock said indexing member in any of its indexed positions coaxially of said bore without circumferential and radial play; actuating means in said housing operatively connected to said housing gear to axially shift the latter with respect to said indexing member gear to disengage said gears thus to release said indexing member for indexing movement; and drive means in said housing operatively connected to said spindle for imparting rotary indexing movement to said indexing member when said gears are disengaged; said housing gear being secured to the outer peripheral portion of a laterally flexible diaphragm of which the inner peripheral portion is fixed to said housing; said actuating means including a fluid cylinder of which the piston is operatively connected to said housing gear and outer peripheral portion of said diaphragm to flex said diaphragm to disengage said housing gear from said indexing member gear in response to fluid pressure acting on one side of said piston; said diaphragm upon release of fluid pressure on said one side of said piston, yieldably urging said housing gear into engagement with said indexing member gear thus to retain said mating annular surfaces in mating engagement; said piston, in response to fluid pressure acting on the other side thereof, forcefully pressing said gears together and urging said mating surfaces into firm frictional engagement for effectively resisting axial load on said indexing member; said cylinder and piston being annular and said piston having a plurality of axially extending posts which are fixed to said piston to extend through bores in said housing and which are axially fixedly connected to the outer peripheral portion of said diaphragm; said drive means comprising a motor driven worm in said housing; and a worm wheel in mesh with said worm and keyed to said spindle; said radially overlapped surfaces being defined by an anti-friction axial thrust bearing means between said worm wheel and said housing.

8. An indexer comprising a housing having a bore therein; an indexing member having a spindle journalled in said bore for rotary indexing movement about the axis of said bore; said housing and indexing member having mating annular surfaces which support said indexing member against axial load in all indexed positions thereof and which constitute an axial thrust bearing during indexing of said indexing member; said spindle and housing having radially overlapped surfaces; said housing and indexing member having annular gears with axially interfitting radial teeth which when interengaged are operative to urge said mating annular surfaces into firm frictional engagement to resist axial load on said indexing member and to lock said indexing member in any of its indexed positions coaxially of said bore without circumferential and radial play; actuating means in said housing operatively connected to said housing gear to axially shift the latter with respect to said indexing member gear to disengage said gears thus to release said indexing member for indexing movement; and drive means in said housing operatively connected to said spindle for imparting rotary indexing movement to said indexing member when said gears are disengaged; said housing gear being secured to the outer peripheral portion of a laterally flexible diaphragm of which the inner peripheral portion is fixed to said housing; said actuating means including a fluid cylinder of which the piston is operatively connected to said housing gear and outer peripheral portion of said diaphragm to flex said diaphragm to disengage said housing gear from said indexing member gear in response to fluid pressure acting on one side of said piston; said diaphragm upon release of fluid pressure on said one side of said piston, yieldably urging said housing gear into engagement with said indexing member gear thus to retain said mating annular surfaces in mating engagement; said piston, in response to fluid pressure acting on the other side thereof, forcefully pressing said gears together and urging said mating surfaces into firm frictional engagement for effectively resisting axial load on said indexing member; said housing having a first passage for conducting fluid pressure to act on said one side of said piston, a second passage for conducting fluid pressure to act on the other side of said piston, and a third passage leading from said first passage to said mating annular surfaces whereby the latter constitute a fluid axial thrust bearing when said indexing member is released for indexing movement by said drive means.

9. The indexer of claim 8 wherein said radially overlapped surfaces are constituted by an anti-friction axial thrust bearing means to decrease the torque required to index said indexing member.

10. The indexer of claim 1 wherein means are provided for introducing fluid under pressure between said mating annular surfaces only while said gears are disengaged whereby said thrust bearing is a fluid thrust bearing to facilitate indexing movement of said indexing member.

* * * * *